No. 751,939. PATENTED FEB. 9, 1904.
C. M. PORTER.
LENS FASTENING FOR SPECTACLES OR EYEGLASSES.
APPLICATION FILED JULY 24, 1903.
NO MODEL.
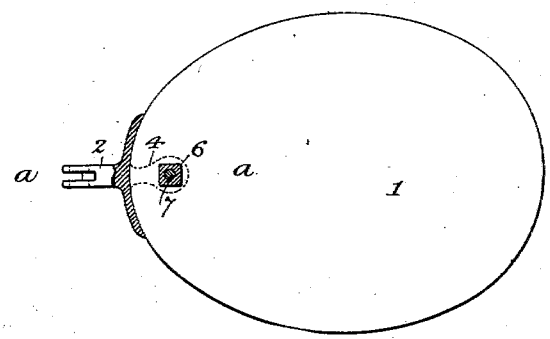
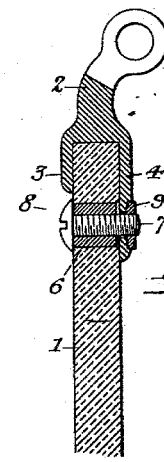
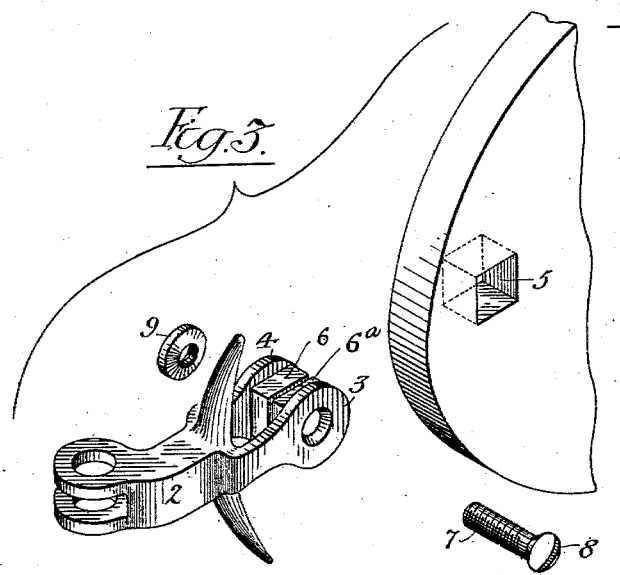
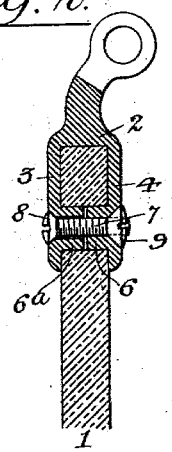
Witnesses:-
Augustus B. Coppes
Herman E. Metius
Inventor:-
Charles M. Porter,
by his Attorneys;
Howson & Howson No. 751,939. Patented February 9, 1904.

UNITED STATES PATENT OFFICE.

CHARLES M. PORTER, OF PHILADELPHIA, PENNSYLVANIA.

LENS-FASTENING FOR SPECTACLES OR EYEGLASSES.

SPECIFICATION forming part of Letters Patent No. 751,939, dated February 9, 1904.

Application filed July 24, 1903. Serial No. 166,899. (No model.)

*To all whom it may concern:*

Be it known that I, CHARLES M. PORTER, a citizen of the United States, residing in Philadelphia, Pennsylvania, have invented certain Improvements in Lens-Fastenings for Spectacles or Eyeglasses, of which the following is a specification.

The object of my invention is to so construct a lens-fastening for spectacles or eyeglasses as to prevent loosening of the same, to which ordinary fastenings are subject. This object I attain in the manner hereinafter set forth, reference being had to the accompanying drawings, in which—

Figure 1 is a view, partly in side elevation and partly in section, of a lens-fastening constructed in accordance with my invention. Fig. 2 is an enlarged section on the line $a\,a$, Fig. 1. Fig. 3 is a perspective view of part of the lens and of the elements of the fastening detached from each other; and Fig. 4 is a view similar to Fig. 2, but illustrating certain modifications of the invention.

Ordinary screw-fastenings for the lenses of spectacles and eyeglasses are objectionable because of their tendency to become loose after a short time, and my invention has been designed with the view of overcoming this objection.

In the drawings, 1 represents the lens or part of the lens of a pair of eyeglasses or spectacles, and 2 one of the mountings therefor, which may be either a temple-hanger, a nose-piece, a spring-post, or a handle, this mounting having clips 3 and 4 bearing upon the opposite sides of the lens in the usual manner. In the lens is formed an opening 5, preferably of square, oval, or such other form as will prevent from turning a nut 6 of like shape, fitted to the opening and forming part of the clip 4, a boss $6^a$ of like shape forming part of the clip 3 and being likewise adapted to the opening 5.

To the nut 6 is adapted a screw-bolt 7, which passes freely through an opening in the clip 3 and boss $6^a$, the beveled head 8 of the bolt bearing upon a countersink in the clip 3 and its opposite end receiving a lock-nut 9, which is also provided with a beveled inner face adapted to a countersink in the clip 4. The formation of the boss $6^a$ on the clip 3 and of the nut 6 on the clip 4 provides in each case an ample body of metal for the formation of the countersinks for the reception of the beveled portions of the bolt-head and lock-nut, which bevels increase the area of bearing of said bolt-head and nut upon the clips, and thus increase the frictional hold of said parts upon each other. When the bolt 7 has been screwed up tightly in the nut 6, the latter is firmly held in its proper lateral position in respect to the lens, and when the nut 9 has been screwed tightly upon the end of the bolt said nut acts as a jam or lock nut and effectually prevents the release or loosening of the bolt 7. Hence the mounting is rigidly locked in position on the lens.

While the connection of the nut 6 to the clip 4 may in most cases be sufficient to prevent it from turning, the confinement of the nut to the lens as against rotary movement aids the clip to resist turning strain upon the nut. Hence the square or other equivalent shape of the opening in the lens, while not necessary in this construction, is preferred. In some cases, however, the nut 6 may be independent of the clips, as shown, for instance, in Fig. 4, in which case the confinement of the nut by the lens, so as to prevent rotary movement of said nut, is essential.

When the mounting has but one extended wing 4, the head of the screw-bolt 7 should be sufficiently large to bear upon the side of the lens beyond the limits of the nut 6, as also shown in Fig. 4.

Having thus described my invention, I claim and desire to secure by Letters Patent—

1. The combination of a lens, a lens-mount, a nut held against rotation, a bolt engaging said nut and retaining the same in proper lateral relation to the lens, and a lock-nut engaging said bolt and bearing upon a wing or clip of the mount, substantially as specified.

2. The combination of a lens, a lens-mount, a nut held against rotation by engagement with the lens, a bolt engaging said nut and retaining the same in proper lateral relation to the lens, and a lock-nut engaging said bolt and bearing upon a wing or clip of the mount, substantially as specified.

3. The combination of a lens, a lens-mount, a nut held against rotation, a bolt engaging said nut and retaining same in proper lateral relation to the lens, and a beveled lock-nut engaging said bolt and bearing upon a countersunk portion of a wing or clip of the mount, substantially as specified.

4. The combination of a lens, a lens-mount, a nut held against rotation by engagement with the lens, a bolt engaging said nut and retaining same in proper lateral relation to the lens, and a beveled lock-nut engaging said bolt and bearing upon a countersunk portion of a wing or clip of the mount, substantially as specified.

5. The combination of a lens, a lens-mount having clips disposed one on each side of said lens, a nut held against rotation, a bolt bearing upon one of said clips and engaging the nut so as to retain the same in proper lateral relation to the lens, and a lock-nut engaging said bolt and bearing upon the other clip, substantially as specified.

6. The combination of a lens, a lens-mount having clips disposed one on each side of said lens, a nut held against rotation by engagement with the lens, a bolt bearing upon one of said clips, and engaging the nut so as to retain the same in proper lateral relation to the lens, and a lock-nut engaging said bolt and bearing upon the other clip, substantially as specified.

7. The combination of a lens, a lens-mount having clips disposed one on each side of said lens, a nut held against rotation, a bolt having a beveled head bearing upon a countersunk portion of one of said clips, said nut engaging the bolt and retaining the same in proper lateral relation to the lens, and a lock-nut engaging said bolt and bearing upon the other clip, substantially as specified.

8. The combination of a lens, a lens-mount having clips disposed one on each side of said lens, a nut held against rotation by engagement with the lens, a bolt having a beveled head bearing upon a countersunk portion of one of said clips, said nut engaging the bolt and retaining the same in proper lateral relation to the lens, and a lock-nut engaging said bolt and bearing upon the other clip, substantially as specified.

9. The combination of a lens, a lens-mount having clips disposed one on each side of said lens, a nut held against rotation, a bolt engaging said nut and retaining same in proper lateral relation to the lens, said bolt having a head bearing upon one of said clips, and a beveled lock-nut engaging the bolt and bearing upon a countersunk portion of the other clip, substantially as specified.

10. The combination of a lens, a lens-mount having clips disposed one on each side of said lens, a nut held against rotation by engagement with the lens, a bolt engaging said nut and retaining the same in proper lateral relation to the lens, said bolt having a head bearing upon one of said clips, and a beveled lock-nut engaging the bolt and bearing upon a countersunk portion of the other clip, substantially as specified.

11. The combination of a lens, a lens-mount having clips disposed one on each side of said lens, a nut held against rotation, a bolt engaging said nut and retaining same in proper lateral relation to the lens, said bolt having a beveled head bearing upon a countersunk portion of one of said clips, and a beveled lock-nut engaging said bolt and bearing upon a countersunk portion of the other clip, substantially as specified.

12. The combination of a lens, a lens-mount having clips disposed one on each side of said lens, a nut held against rotation by engagement with the lens, a bolt engaging said nut and retaining same in proper lateral relation to the lens, said bolt having a beveled head bearing upon a countersunk portion of one of said clips, and a beveled lock-nut engaging said bolt and bearing upon a countersunk portion of the other clip, substantially as specified.

13. The combination of a lens having an opening therein, a lens-mount having a clip with nut thereon which enters said opening, a bolt engaging said nut and retaining same in proper lateral relation to the lens, and a beveled lock-nut engaging the bolt and bearing upon a countersunk portion of the clip, substantially as specified.

14. The combination of a lens having an opening therein, a lens-mount having a clip with nut thereon which enters said opening and is held against rotation by engagement with the lens, a bolt engaging said nut and retaining same in proper lateral relation to the lens, and a lock-nut engaging the bolt and bearing upon the clip, substantially as specified.

15. The combination of a lens having an opening therein, a lens-mount having a clip with nut thereon which enters said opening and is held against rotation by engagement with the lens, a bolt engaging said nut and retaining same in proper lateral relation to the lens, and a beveled lock-nut engaging the bolt and bearing upon a countersunk portion of the clip, substantially as specified.

16. The combination of a lens having an opening therein, a lens-mount having clips on opposite sides of the lens, one of said clips having a boss projecting into the opening in the lens, a nut also contained in said opening and held against rotation by engagement with the lens, a bolt engaging said nut and having a beveled head bearing upon a countersunk portion of the clip which carries the boss, and a lock-nut also engaging the bolt and bearing upon the opposite clip, substantially as specified.

17. The combination of a lens having an opening therein, a lens-mount having clips on opposite sides of the lens, one of said clips having a boss entering the opening in the lens, a nut also contained in said opening and held against rotation by engagement with the lens, a bolt engaging said nut and having a beveled head bearing upon a countersunk portion of the clip which carries the boss, and a beveled lock-nut engaging the bolt and bearing upon a countersunk portion of the opposite clip, substantially as specified.

18. The combination of a lens having an opening therein, a lens-mount having clips on opposite sides of the lens, one of said clips having a boss which enters the opening in the lens, and the other clip having a nut which also enters said opening, a bolt engaging said nut and having a beveled head which bears upon the countersunk portion of the clip carrying the boss, and a beveled lock-nut engaging the bolt and bearing upon a countersunk portion of the other clip, substantially as specified.

19. The combination of a lens having an opening therein, a lens-mount having clips on opposite sides of the lens, one of said clips having a boss entering the opening in the lens, and the other clip having a nut also entering said opening and held against rotation by engagement with the lens, a bolt engaging said nut and having a beveled head bearing upon a countersunk portion of the clip which carries the boss, and a beveled lock-nut engaging the bolt and bearing upon a countersunk portion of the other clip, substantially as specified.

20. A lens for spectacles or eyeglasses having therein an opening for the reception of a nut, said opening being shaped to prevent the turning of the nut therein about its axis, substantially as specified.

In testimony whereof I have signed my name to this specification in the presence of two subscribing witnesses.

CHARLES M. PORTER.

Witnesses:
F. E. BECHTOLD,
JOS. H. KLEIN.